Patented Sept. 25, 1951

2,569,131

UNITED STATES PATENT OFFICE 2,569,131

PENTACHLOROSTYRENE AND POLYMERS THEREOF

Moushy Markarian, North Adams, Mass., assignor to Sprague Electric Company, North Adams, Mass., a corporation of Massachusetts No Drawing. Application January 4, 1947, Serial No. 720,309

6 Claims. (Cl. 260—87.5)

This invention relates to a new halogenated aromatic vinyl compound and polymers thereof, and more particularly refers to processes for preparing and polymerizing pentachlorostyrene to produce new and useful resinous products.

The object of this invention is to produce pentachlorostyrene and polymers thereof by simple and relatively rapid means. I have found that pentachlorostyrene may be readily prepared by dehydrohalogenating betachloroethylpentachlorobenzene and by dehydrating methylpentachlorophenyl carbinol. The monomer thus produced is a crystalline solid with a melting point of 113-114.5° C. The monomer may be polymerized or copolymerized readily to produce plastics and resinous materials varying from viscous liquids to hard, brittle, non-inflammable resins.

The following examples serve to illustrate the preparation of the monomer and polymer as well as a number of copolymers of the pentachlorostyrene.

EXAMPLE 1

Preparation of betachloroethylpentachlorobenzene 1200 gms. carbon tetrachloride
1253 gms. ethylpentachlorobenzene (4.5 moles)
540 gms. sulfuryl chloride (4 moles)
4.84 gms. benzoyl peroxide (.02 mole)

The reactants were placed in a three-liter, single-necked flask equipped with a bulb-type reflux condenser to the top of which was attached a Friedrichs-type reflux condenser, and heated until reflux temperature was reached. A vigorous evolution of HCl and $SO_2$ began approximately 5 minutes after refluxing started. The mixture was heated thus for 17 hours at the end of which time evolution of gas was very slow. The condensers were removed and a Vigreux-type heated fractionating column was attached. The carbon tetrachloride and unreacted sulfuryl chloride were removed at 15 mm. pressure. More heat was applied and the residue was fractionated at 15 mm. to make the following fractions:

| Fraction No. | Boiling Point, °C. | Amount |
|---|---|---|
| | | Gms. |
| 1 | 177-182 | 464 |
| 2 | 182-185 | 99 |
| 3 | 190-201 | 542 |
| 4 | Above 201 | 243 |

Fraction 3 was betachloroethylpentachlorobenzene. Upon crystallization from denatured alcohol it produced crystals having a melting point of about 85° C.

EXAMPLE 2

Preparation of pentachlorostyrene

In a three-liter triple-necked flask equipped with a stirrer, reflux condenser and dropping funnel, were placed 525 cc. absolute alcohol and 180 grams KOH. Heat and agitation were applied until the KOH had dissolved, at which time the melted betachloroethylpentachlorobenzene (Fraction No. 3 of Example 1—542 grams) was run in gradually with an exothermic reaction taking place, causing refluxing of the alcohol. When all of the betachloroethylpentachlorobenzene had been added, refluxing was continued with agitation for one hour. Water was added to make a volume of 2½ liters and the mixture was poured while still hot into a separatory funnel. The lower oily layer was drawn off and dissolved in benzene and washed with water several times. The benzene was distilled off at about 16 mm. pressure and the residue poured while still hot into an evaporating dish. Upon standing overnight the material had crystallized to a heavy slush. By suction filtering, freezing the mother liquor and suction filtering again there were obtained 186 grams of brownish white crystals. After two recrystallizations the melting point of the pure white crystals was 105-108° C.

EXAMPLE 3

Preparation of pentachlorostyrene

The procedure given in Example 2 was followed with the 243 gram, Fraction No. 4 of Example 1. The crystals obtained after one recrystallization of the product from denatured alcohol had a melting point of 105-108° C., a total of 56 grams being obtained. The pentachlorostyrene of Example 3 was mixed with some of the penta chlorostyrene of Example 2 to make a mixed melting point determination. The melting point of the mixture was 105-108° C., indicating that the products are the same and that Fraction No. 3 could have been extended to a higher boiling range.

EXAMPLE 4

Preparation of pentachlorostyrene

Methylpentachlorophenyl carbinol, a known compound of M. P. 126° C., was prepared by the method of Gunther Lock, Ber. 72B, 1939, 300-304, and dehydrated in the following manner:

An 18-inch pyrex tube with a 1-inch inside diameter was provided with an external heat coil and filled for approximately 15 inches of its length with aluminum oxide pellets. A temperature of 340° C. was maintained in the column. The column was mounted vertically with a dropping funnel above and a cooled flask with a vacuum connection below.

30 grams of the methyl pentachlorophenyl carbinol were placed in the dropping funnel and melted by means of a burner flame. Water pump vacuum was applied to the system and the molten carbinol dropped in gradually. The complete process took about 25 minutes. The product collected in the receiver was a pure white to slightly yellowish solid.

The product recrystallized once from methanol gave a yield of 17 gms. of crystals, with a melting point of 108.4–112° C. Repeated recrystallization increased the melting point to 113–114.5° C.

A mixed melting point determination was made on a mixture of the pentachlorostyrene prepared in Example 3 and the above product to give a melting point of 107–109.5° C., indicating that the products were the same. A mixed melting point determination made on the crystals referred to above and the original carbinol gave a melting point of 88–101° C.

EXAMPLE 5

*Preparation of polymers and copolymers of pentachlorostyrene*

A number of samples of the pentachlorostyrene prepared in Examples 2, 3 and 4 were placed in test tubes and heated for 24 hours at about 115° C. Before the heating, some of the samples had added thereto amounts of other polymerizable materials to evaluate the copolymerization phenomena. The following table gave the results of the polymerization:

TABLE

| | Sample | After heating 24 hours at 115° C. |
|---|---|---|
| 1 | pentachlorostyrene, Example 2 | hard, clear polymer. |
| 2 | pentachlorostyrene, Example 3 | Do. |
| 3 | pentachlorostyrene, Example 4 | Do. |
| 4 | 50% pentachlorostyrene, 50% n-vinyl carbazole. | reddish, hard polymer. |
| 5 | 75% pentachlorostyrene, 25% styrene | hard, clear polymer. |
| 6 | 50% pentachlorostyrene, 50% 2,5-dichlorostyrene. | hard, slightly opaque polymer. |
| 7 | pentachlorostyrene (Example 2), plus a trace of benzoyl peroxide. | hard, clear polymer. |
| 8 | pentachlorostyrene (Example 2), plus a trace of sulfuric acid. | Do. |

It is also possible to polymerize the pentachlorostyrene to a liquid, low polymeric state by use of organic and/or inorganic catalysts and heat. Typical acids for this purpose are oxalic acid and boric acid. However, Friedel-Crafts catalysts such as aluminum chloride, boron trifluoride and the like are also useful in this connection. Following such polymerization, the liquid polymer may be hydrogenated to prevent further polymerization and to increase the stability of the liquid.

The solid polymers and liquid polymers of the invention possess a fairly high density and, because of their high chlorine content, are substantially non-inflammable. For electrical purposes they possess the further advantage of a chemical construction in which chlorine and hydrogen atoms are not substituted upon the same or adjacent carbon atoms, thus reducing the likelihood of hydrochloric acid formation under the effects of high electrical field strengths and/or heat.

In accordance with my invention I also contemplate producing a related divinyl benzene compound which may be polymerized or copolymerized with the pentachlorostyrene of the invention to produce resins which are thermosetting in nature. This I accomplish by reacting diethyltetrachlorobenzene with chlorine under side chain chlorination conditions to produce a beta, beta', dichlorodiethyltetrachlorobenzene. This intermediate may be dehydrohalogenated to produce the divinyltetrachlorobenzene.

The resins of the invention possess exceedingly high softening points and for this reason are useful in substitutes for polystyrene and other polyvinyl resins under conditions which require resistance to flow at high temperatures.

While I have above listed a number of polymerizable aromatic vinyl compounds and a vinyl pyrrole compound as useful in copolymerization with pentachlorostyrene, it is also possible to copolymerize the pentachlorostyrene with aliphatic-type unsaturated polymerizable compounds such as 1,3 butadiene to produce oil-resistant, temperature-resistant rubber compositions.

In addition to the foregoing modifications which may be made in this invention it should be understood that the pentachlorostyrene hereof may be produced either by the process of Example 2 or any of the following processes:

*a.* Dehydrohalogenating alpha or beta bromoethylpentachlorobenzene with alcoholic KOH or NaOH;

*b.* Distilling alpha or beta chloroethylpentachlorobenzene under reduced pressure, with or without a catalyst;

*c.* Dehydrogenating ethylpentachlorobenzene at elevated temperatures.

As many apparently widely different embodiments of this invention may be made without departing from the spirit and scope hereof, it is to be understood that the invention is not limited to the specific embodiments hereof except as defined in the appended claims.

What I claim is:

1. A readily polymerizable, crystalline, solid, nuclear substituted pentachlorostyrene possessing a melting point between about 105° C. and about 114.5° C.

2. A polymer of nuclear substituted pentachlorostyrene.

3. A copolymer obtained by polymerizing a mixture of nuclear substituted pentachlorostyrene and styrene in which the pentachlorostyrene is present in major amount.

4. A copolymer obtained by polymerizing a mixture of substantially equal amounts by weight of nuclear substituted pentachlorostyrene and n-vinyl carbazole.

5. A homopolymer of nuclear substituted pentachlorostyrene.

6. A copolymer obtained by polymerizing a mixture consisting of from about 50 to about 75% by weight of a nuclear substituted pentachlorostyrene and from about 25 to about 50% by weight of another polymerizable vinyl aromatic compound.

MOUSHY MARKARIAN.

REFERENCES CITED

The following references are of record in the file of this patent:

UNITED STATES PATENTS

| Number | Name | Date |
|---|---|---|
| 2,193,823 | Levine et al. | Mar. 19, 1940 |
| 2,226,809 | Driesbach | Dec. 31, 1940 |